US011026263B2

(12) United States Patent
Geng et al.

(10) Patent No.: US 11,026,263 B2
(45) Date of Patent: Jun. 1, 2021

(54) SYSTEM INFORMATION OBTAINING AND SENDING METHOD AND RELATED APPARATUS

(71) Applicant: Huawei Technologies Co., Ltd., Shenzhen (CN)

(72) Inventors: Tingting Geng, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 16/370,275

(22) Filed: Mar. 29, 2019

(65) Prior Publication Data

US 2019/0230713 A1 Jul. 25, 2019

Related U.S. Application Data

(63) Continuation of application No. PCT/CN2017/104807, filed on Sep. 30, 2017.

(30) Foreign Application Priority Data

Sep. 30, 2016 (CN) .......................... 201610878407.3

(51) Int. Cl.
*H04W 74/08* (2009.01)
*H04W 48/08* (2009.01)
(Continued)

(52) U.S. Cl.
CPC ....... *H04W 74/0833* (2013.01); *H04W 48/08* (2013.01); *H04W 48/14* (2013.01);
(Continued)

(58) Field of Classification Search
None
See application file for complete search history.

(56) References Cited

U.S. PATENT DOCUMENTS

2014/0226621 A1* 8/2014 Choi ................. H04W 36/0061
370/331

FOREIGN PATENT DOCUMENTS

CN 101217689 A 7/2008
CN 106992953 A 7/2017
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 12), 3GPP TS 56.331 V12.11.0, Sep. 2016, 456 pages (Year: 2016).*

(Continued)

*Primary Examiner* — Shripal K Khajuria
(74) *Attorney, Agent, or Firm* — Slater Matsil, LLP

(57) ABSTRACT

A system information obtaining and sending method and a related apparatus are disclosed. A terminal receives configuration indication information sent by a network device, where the configuration indication information includes RACH preamble configuration information corresponding to first system information; and the terminal sends a first request message used to obtain the first system information, to the network device according to the RACH preamble configuration information corresponding to the first system information, so that the RACH preamble configuration information is reused in the first request message.

12 Claims, 5 Drawing Sheets

(51) Int. Cl.
H04W 48/14 (2009.01)
H04W 72/04 (2009.01)
H04W 88/02 (2009.01)
H04W 88/08 (2009.01)

(52) U.S. Cl.
CPC ... *H04W 72/0446* (2013.01); *H04W 72/0453* (2013.01); *H04W 88/023* (2013.01); *H04W 88/08* (2013.01)

(56) References Cited

FOREIGN PATENT DOCUMENTS

| EP | 3419340 A1 | 12/2018 | | |
|----|------------|---------|---|---|
| WO | 2016130353 A2 | 8/2016 | | |
| WO | WO-2016130353 A2 | * | 8/2016 | ............. H04L 12/18 |

OTHER PUBLICATIONS

Samsung (Email Rapporteur), "Report of Email Discussion on [94#40][NR] System Information," 3GPP TSG-RAN WG2 95, R2-165201, Aug. 22-26, 2016, 41 pages, Gothenburg, Sweden. (Year: 2016).*

Samsung: "System Information Signalling Design in NR," 3GPP TSG-RAN WG2 Meeting #94, R2-163371, May 23-27, 2016, 7 pages, Nanjing, China.

CATT: "On-Demand System Information Delivery Mechanism," 3GPP TSG RAN WG2 Meeting #95, R2-164811, Aug. 22-26, 2016, 6 pages, Gothenburg, Sweden.

ETRI: "Details of System Information Delivery in NR," 3GPP TSG-RAN WG2 Meeting #95, R2-165162, Aug. 22-26, 2016, 3 pages, Goteborg, Sweden.

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.11.0, Sep. 2016, 456 pages.

Samsung (Email Rapporteur), "Report of Email Discussion on [94#40][NR] System Information," 3GPP TSG-RAN WG2 95, R2-165201, Aug. 22-26, 2016, 41 pages, Gothenburg, Sweden.

Huawei et al., "On Demand SI Acquisition and Failure Handling," 3GPP TSG-RAN WG2 NR adhoc#02, R2-1706768, Jun. 27-29, 2017, 8 pages, Qingdao, China.

* cited by examiner

SYSTEM INFORMATION OBTAINING AND SENDING METHOD AND RELATED APPARATUS

CROSS-REFERENCE TO RELATED APPLICATIONS

This application is a continuation of International Application No. PCT/CN2017/104807, filed on Sep. 30, 2017, which claims priority to Chinese Patent Application No. 201610878407.3, filed on Sep. 30, 2016, both of which are incorporated herein by reference in their entireties.

TECHNICAL FIELD

This application relates to the field of communications technologies, and in particular, to a system information obtaining and sending method and a related apparatus.

BACKGROUND

In a wireless communications system, a network device notifies a terminal of different types of system-related information by using system information (SI). The system-related information is, for example, network information of a cell in which the terminal is located, information about a registration area, information about a common channel, and information about other cells. Based on manners of sending the system information by the network device, the system information may be classified into two types: necessary system information (minimum SI) sent by periodic broadcast, where the minimum SI includes cell selection and initial access information; and first system information (other SI), for example, Multimedia Broadcast Multicast Service (MBMS)-related system information, sent according to a request of the terminal.

To obtain the other SI, the terminal sends a request message to the network device. Consequently, the request message sent by the terminal to obtain the other SI occupies a large quantity of system resources.

SUMMARY

Embodiments of the present invention provide a system information obtaining and sending method and a related apparatus, to resolve a problem that a request message sent by a terminal to obtain other SI occupies a large quantity of system resources.

An embodiment of the present invention provides a system information obtaining method. The method includes receiving, by a terminal, configuration indication information sent by a network device. The configuration indication information includes random access channel preamble RACH preamble configuration information corresponding to first system information. The method further includes sending, by the terminal, a first request message used to obtain the first system information, to the network device according to the RACH preamble configuration information corresponding to the first system information. The method further includes receiving, by the terminal, the first system information that is returned by the network device according to the first request message.

In this case, the terminal receives the configuration indication information sent by the network device; and sends the first request message used to obtain the first system information, to the network device according to the RACH preamble configuration information corresponding to the first system information and included in the configuration indication information, so that the RACH preamble configuration information is reused in the first request message, and the network device does not need to configure independent information for the first request message, thereby greatly reducing system resources occupied by the first request message.

Optionally, the method further includes receiving, by the terminal, type indication information sent by the network device, where the type indication information includes a type of the first system information. Before the sending, by the terminal, a first request message used to obtain the first system information, to the network device, the method further includes: determining, by the terminal based on the type indication information, that the type of the first system information is common system information.

In this case, only after receiving the type indication information and determining, based on the type indication information, that the type of the first system information is the common system information, the terminal can send the first request message to the network device according to the RACH preamble configuration information corresponding to the first system information, thereby more properly configuring resources.

Optionally, the method further includes: if determining, based on the type indication information, that the type of the first system information is not the common system information, sending, by the terminal by using Radio Resource Control RRC signaling, a request message used to obtain the first system information.

In this case, if needing to obtain non-common system information, the terminal may initiate a request by using the RRC signaling, so that for different types of system information, different mechanisms are used to initiate a request message, thereby properly configuring resources and significantly increasing network resource utilization.

Optionally, the RACH preamble configuration information corresponding to the first system information is random access channel preamble index RACH preamble index information corresponding to the first system information. The sending, by the terminal, a first request message used to obtain the first system information, to the network device according to the RACH preamble configuration information corresponding to the first system information includes: sending, by the terminal, the first request message to the network device according to the RACH preamble index information corresponding to the first system information, where the first request message includes the RACH preamble index information corresponding to the first system information.

In this case, the RACH preamble index information is reused in the first request message sent by the terminal, so that the network device does not need to allocate independent preamble index information to the first request message, thereby reducing system resources occupied by the first request message.

Optionally, the RACH preamble configuration information corresponding to the first system information is RACH preamble index information corresponding to a system information group in which the first system information is located. The sending, by the terminal, a first request message used to obtain the first system information, to the network device according to the RACH preamble configuration information corresponding to the first system information includes: sending, by the terminal, the first request message to the network device according to the RACH preamble index information corresponding to the system information group in which the first system information is located, where the first request message includes the RACH preamble index information corresponding to the system information group in which the first system information is located.

In this case, the RACH preamble configuration information corresponding to the first system information is the RACH preamble index information corresponding to the system information group in which the first system information is located. That is, there is a correspondence between the system information group and the RACH preamble index information. In such a manner of setting a correspondence by dividing a system information group, a case in which there may be a plurality of pieces of first system information, and limited preamble indication information reserved in a RACH preamble index is fully considered, so that a correspondence between the preamble indication information and the first system information is more properly set.

Optionally, the RACH preamble configuration information corresponding to the first system information is RACH preamble-occupied resource information corresponding to the first system information. The sending, by the terminal, a first request message used to obtain the first system information, to the network device according to the RACH preamble configuration information corresponding to the first system information includes: sending, by the terminal, the first request message to the network device by using the RACH preamble-occupied resource information corresponding to the first system information.

In this case, the RACH preamble-occupied resource information is reused in the first request message sent by the terminal, so that the network device does not need to allocate independent resource information to the first request message, thereby reducing system resources occupied by the first request message. Further, if both the RACH preamble index information and the RACH preamble-occupied resource information are reused in the first request message sent by the terminal, the network device may not need to allocate preamble index information and resource information to the first request message, thereby reducing system resources to a greater extent occupied by the first request message.

Optionally, the RACH preamble-occupied resource information corresponding to the first system information includes time domain resource information reserved in the RACH preamble-occupied resource information, and frequency domain resource information corresponding to the reserved time domain resource information.

This application provides a system information sending method. The method includes sending, by a network device, configuration indication information to a terminal. The configuration indication information includes random access channel preamble RACH preamble configuration information corresponding to first system information. The method further includes receiving, by the network device, a first request message that is used to obtain the first system information and that is sent by the terminal according to the RACH preamble configuration information corresponding to the first system information. The method further includes returning, by the network device, the first system information to the terminal according to the first request message.

In this case, the network device sends the RACH preamble configuration information corresponding to the first system information to the terminal, so that the terminal can reuse the RACH preamble configuration information to send the first request message, thereby greatly reducing system resources occupied by the first request message.

Optionally, the method further includes: sending, by the network device, type indication information to the terminal, where the type indication information includes a type of the first system information.

In this case, the network device sends the type of the first system information to the terminal, so that based on different types of the first system information, the terminal can use different request message sending mechanisms, thereby properly configuring resources.

Optionally, the RACH preamble configuration information corresponding to the first system information is RACH preamble index information corresponding to the first system information. The returning, by the network device, the first system information to the terminal according to the first request message includes: obtaining, by the network device based on RACH preamble index information included in the first request message, the first system information corresponding to the RACH preamble index information included in the first request message; and sending, by the network device, the first system information to the terminal.

Optionally, the RACH preamble configuration information corresponding to the first system information is RACH preamble index information corresponding to a system information group in which the first system information is located. The returning, by the network device, the first system information to the terminal according to the first request message includes: obtaining, by the network device based on RACH preamble index information included in the first request message, a system information group corresponding to the RACH preamble index information included in the first request message, where the system information group includes the first system information.

Optionally, the RACH preamble configuration information corresponding to the first system information is RACH preamble-occupied resource information corresponding to the first system information. The receiving, by the network device, a first request message that is used to obtain the first system information and that is sent by the terminal according to the RACH preamble configuration information corresponding to the first system information includes: receiving, by the network device according to the RACH preamble-occupied resource information corresponding to the first system information, the first request message that is sent by the terminal by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

This application provides a terminal, including a receiving module, configured to receive configuration indication information sent by a network device. The configuration indication information includes random access channel preamble RACH preamble configuration information corresponding to first system information. The terminal further includes a sending module, configured to send a first request message used to obtain the first system information, to the network device according to the RACH preamble configuration information corresponding to the first system information. The receiving module is further configured to receive the first system information that is returned by the network device according to the first request message.

Optionally, the receiving module is further configured to receive type indication information sent by the network device, where the type indication information includes a type of the first system information. Before sending the first request message used to obtain the first system information, to the network device according to the RACH preamble configuration information corresponding to the first system information, the sending module is further configured to: determine, based on the type indication information, that the type of the first system information is common system information.

Optionally, the sending module is further configured to: if determining, based on the type indication information, that the type of the first system information is not the common system information, send, by using Radio Resource Control RRC signaling, a request message used to obtain the first system information.

Optionally, the RACH preamble configuration information corresponding to the first system information is RACH preamble index information corresponding to the first system information. The sending module is specifically configured to: send the first request message to the network device according to the RACH preamble index information corresponding to the first system information, where the first request message includes the RACH preamble index information corresponding to the first system information.

Optionally, the RACH preamble configuration information corresponding to the first system information is RACH preamble index information corresponding to a system information group in which the first system information is located. The sending module is specifically configured to: send the first request message to the network device according to the RACH preamble index information corresponding to the system information group in which the first system information is located, where the first request message includes the RACH preamble index information corresponding to the system information group in which the first system information is located.

Optionally, the RACH preamble configuration information corresponding to the first system information is RACH preamble-occupied resource information corresponding to the first system information. The sending module is specifically configured to: send the first request message to the network device by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

This application provides a network device, including: a sending module, configured to send configuration indication information to a terminal, where the configuration indication information includes random access channel preamble RACH preamble configuration information corresponding to first system information. The network device further includes a receiving module, configured to receive a first request message that is used to obtain the first system information and that is sent by the terminal according to the RACH preamble configuration information corresponding to the first system information. The sending module is further configured to return the first system information to the terminal according to the first request message.

Optionally, the sending module is further configured to send type indication information to the terminal, where the type indication information includes a type of the first system information.

Optionally, the RACH preamble configuration information corresponding to the first system information is RACH preamble index information corresponding to the first system information. The sending module is specifically configured to: obtain, based on RACH preamble index information included in the first request message, the first system information corresponding to the RACH preamble index information included in the first request message; and send the first system information to the terminal.

Optionally, the RACH preamble configuration information corresponding to the first system information is RACH preamble index information corresponding to a system information group in which the first system information is located. The sending module is specifically configured to: obtain, based on RACH preamble index information included in the first request message, a system information group corresponding to the RACH preamble index information included in the first request message, where the system information group includes the first system information.

Optionally, the RACH preamble configuration information corresponding to the first system information is RACH preamble-occupied resource information corresponding to the first system information. The receiving module is specifically configured to: receive, according to the RACH preamble-occupied resource information corresponding to the first system information, the first request message that is sent by the terminal by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

This application provides another terminal, including: a receiver, configured to receive configuration indication information sent by a network device, where the configuration indication information includes random access channel preamble RACH preamble configuration information corresponding to first system information. The terminal further includes a transmitter, configured to send a first request message used to obtain the first system information, to the network device according to the RACH preamble configuration information corresponding to the first system information. The receiver is further configured to receive the first system information that is returned by the network device according to the first request message.

Optionally, the receiver is further configured to receive type indication information sent by the network device, where the type indication information includes a type of the first system information. Before sending the first request message used to obtain the first system information to the network device, the transmitter is further configured to: determine, based on the type indication information, that the type of the first system information is common system information.

Optionally, the transmitter is further configured to: if determining, based on the type indication information, that the type of the first system information is not the common system information, send, by using Radio Resource Control RRC signaling, a request message used to obtain the first system information.

Optionally, the RACH preamble configuration information corresponding to the first system information is RACH preamble index information corresponding to the first system information. The transmitter is specifically configured to: send the first request message to the network device according to the RACH preamble index information corresponding to the first system information, where the first request message includes the RACH preamble index information corresponding to the first system information.

Optionally, the RACH preamble configuration information corresponding to the first system information is RACH preamble index information corresponding to a system information group in which the first system information is located. The transmitter is specifically configured to: send the first request message to the network device according to the RACH preamble index information corresponding to the system information group in which the first system information is located, where the first request message includes the RACH preamble index information corresponding to the system information group in which the first system information is located.

Optionally, the RACH preamble configuration information corresponding to the first system information is RACH preamble-occupied resource information corresponding to the first system information. The transmitter is specifically configured to: send the first request message to the network device by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

This application provides another network device, including: a transmitter, configured to send configuration indication information to a terminal, where the configuration indication information includes random access channel preamble RACH preamble configuration information corresponding to first system information. The network device further includes a receiver, configured to receive a first request message that is used to obtain the first system information and that is sent by the terminal according to the RACH preamble configuration information corresponding to the first system information. The transmitter is further configured to return the first system information to the terminal according to the first request message.

Optionally, the transmitter is further configured to send type indication information to the terminal, where the type indication information is used to indicate whether the first system information is common other SI.

Optionally, the RACH preamble configuration information corresponding to the first system information is RACH preamble index information corresponding to the first system information. The transmitter is specifically configured to: obtain, based on RACH preamble index information included in the first request message, the first system information corresponding to the RACH preamble index information included in the first request message; and send the first system information to the terminal.

Optionally, the RACH preamble configuration information corresponding to the first system information is RACH preamble index information corresponding to a system information group in which the first system information is located. The transmitter is specifically configured to: obtain, based on RACH preamble index information included in the first request message, a system information group corresponding to the RACH preamble index information included in the first request message, where the system information group includes the first system information.

Optionally, the RACH preamble configuration information corresponding to the first system information is RACH preamble-occupied resource information corresponding to the first system information. The receiver is specifically configured to: receive, according to the RACH preamble-occupied resource information corresponding to the first system information, the first request message that is sent by the terminal by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

This application further provides a computer readable storage medium, where the storage medium stores an instruction, and when the instruction is run on a computer, the computer is enabled to perform the method according to any design described above.

This application further provides a computer program product including an instruction, where when the computer program product is run on a computer, the computer is enabled to perform the method according to any design described above.

This application further provides a computer program, where when the computer program is run on a computer, the computer is enabled to perform the method according to any design described above.

In this application, the terminal receives the configuration indication information sent by the network device, where the configuration indication information includes the RACH preamble configuration information corresponding to the first system information; and the terminal sends the first request message used to obtain the first system information, to the network device according to the RACH preamble configuration information corresponding to the first system information, so that the RACH preamble configuration information is reused in the first request message, and the network device does not need to configure independent information for the first request message, thereby greatly reducing system resources occupied by the first request message.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of this application, the terms "first", "second", and so on are intended to distinguish between different objects but do not indicate a particular order. In addition, the terms "comprising", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
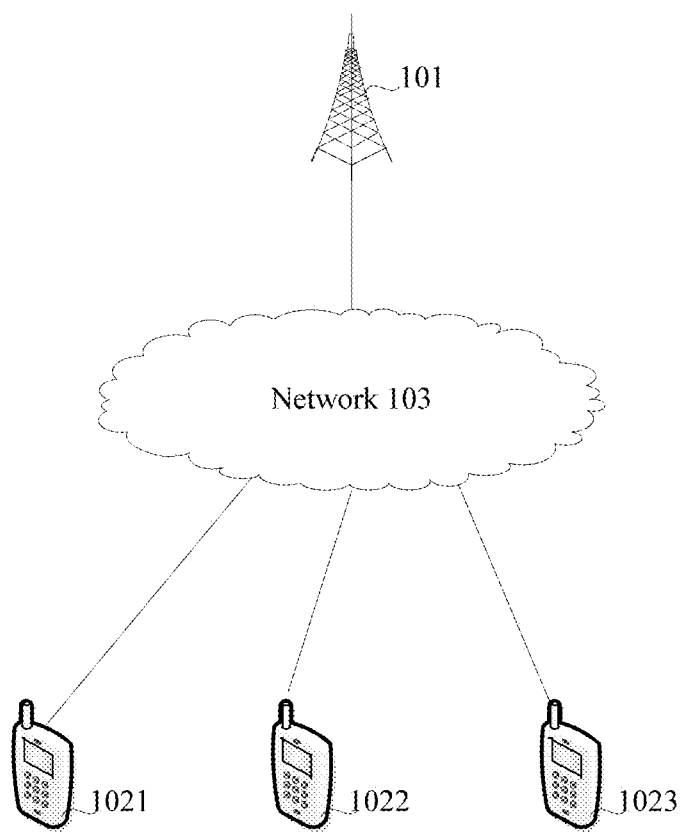
FIG. 1 is a schematic diagram of a system architecture applicable to an embodiment of this application.

A system information obtaining and sending method in this application may be applied to a plurality of system architectures. FIG. 1 is a schematic diagram of a system architecture applicable to an embodiment of this application. As shown in FIG. 1, the system architecture includes a network device 101, and one or more terminals such as a first terminal 1021, a second terminal 1022, and a third terminal 1023 shown in FIG. 1. The network device 101 may wirelessly communicate with the first terminal 1021, the second terminal 1022, and the third terminal 1023 by using a network 103, that is, the network device 101 may wirelessly transmit information to the terminals.

In this embodiment of the present invention, the network device may be a base station device (BS). The base station device may also be referred to as a base station, and is an apparatus deployed in a radio access network and used to provide a wireless communication function. For example, in a 2G network, a device providing a base station function includes a base transceiver station (BTS) and a base station controller (BSC); in a 3G network, a device providing a base station function includes a NodeB and a radio network controller (RNC); in a 4G network, a device providing a base station function includes an evolved NodeB (eNB); in a 5G network, a device providing a base station function includes a new radio NodeB (gNB), a centralized unit (CU), a distributed unit, and a new radio controller; in a WLAN, a device providing a base station function is an access point (AP).

The terminal may be a device providing voice and/or data connectivity for a user, and include a wireless terminal. The wireless terminal may be a handheld device with a wireless connection function, or another processing device connected to a wireless modem, and may be a mobile terminal that communicates with one or more core networks by using a radio access network. For example, the wireless terminal may be a mobile phone, a computer, a tablet computer, a personal digital assistant (PDA), a mobile Internet device (MID), a wearable device, and an e-book reader. For another example, the wireless terminal may also be a portable, pocket-sized, handheld, computer built-in, or in-vehicle mobile device. For still another example, the wireless terminal may be a part of a mobile station, an access point, or user equipment (UE).

In the foregoing system architecture, the network device 101 notifies the first terminal 1021, the second terminal 1022, and the third terminal 1023 of different types of system-related information by using system information. Specifically, the network device 101 may broadcast the system information to the first terminal 1021, the second terminal 1022, and the third terminal 1023. However, if all system information is sent through broadcasting, broadcast of the system information will occupy a large quantity of radio frame resources. Therefore, the system information may be classified into two types, to be specific, necessary system information minimum SI and first system information other SI. The minimum SI may be a necessary system information block (minimum Scheduling Information Block, minimum SIB for short). Similarly, the other SI may also be a first system information block (other Scheduling Information Block, other SIB for short).

The network device 101 may send the minimum SI by broadcast; and for the other SI, the terminal may actively initiate a first request message, and the network device 101 sends the other SI to the terminal according to the first request message. That is, the network device does not need to periodically broadcast the other SI, but only needs to reply with a response message carrying the other SI that is requested in the first request message, when receiving the first request message of the terminal. For example, after determining that the other SI needs to be obtained, the first terminal 1021 may send, to the network device, a request message for requesting the other SI, and the network device returns a response message carrying the other SI, to the first terminal 1021 according to the received request message. In such a manner, fewer broadcast channels may be occupied, thereby effectively reducing broadcast channel overheads.

The network device may determine a manner of sending the response message carrying the other SI that is requested in the first request message, for example, by broadcast, multicast, or unicast. Broadcast means that the network device sends the other SI to all UEs; multicast means that the network device selectively sends the other SI to some UEs; and unicast means that generally, the network device sends the other SI to only one UE by using dedicated Radio Resource Control (RRC) signaling. The network device may determine a manner of sending a piece of other SI, based on a quantity of first request messages that are sent by UE and that are received within a time segment, a type of the UE, a capability of the UE, a service type of the UE, another network policy, or the like.

Further, for a case in which the terminal obtains the other SI by sending a request message, a possible implementation is to introduce a system information preamble (SI preamble). In other words, the terminal sends an SI preamble to the network device to obtain the system information.

For a specific manner of sending an SI preamble by the terminal, this application provides a solution: The terminal uses an independent SI preamble index and independent SI resource information to send an SI preamble. The independent SI preamble index may be determined based on at least one type of information such as a root sequence of an independent SI preamble sequence configured by the network device, a cyclic shift length of a root sequence, and a quantity of SI preamble sequences, and sent to the terminal to generate an SI preamble index. For example, the network device may configure the following information shown in Table 1a, so that the terminal can generate an independent SI preamble index.

TABLE 1a

Information configured by a network device
and used to generate an SI preamble index SI preamble index

| | |
|---|---|
| >rootSequenceIndexforSI | Indicating a root sequence of an SI preamble sequence |
| >zeroCorrelationZoneConfig | Indicating a cyclic shift length of a root sequence |
| >numberOfSI-Preambles | Indicating a quantity of SI preamble sequences |

Independent SI resource information may be about an independent time domain resource and frequency domain resource that are configured by the network device and sent to the terminal. Table 1b shows resource information configured by the network device and used to send an SI preamble.

TABLE 1b

Resource information configured by a network
device and used to send an SI preamble SI preamble index

| | |
|---|---|
| >SIPreamble-Timeoffset | Indicating time domain information sent by an SI preamble sequence |
| >SIPreamble-FreqOffset | Indicating frequency domain information sent by an SI preamble sequence |

Based on the foregoing solution, to further reduce system resources occupied by the request message that is sent by the terminal to obtain the other SI, this application further provides a more effective system information obtaining and sending method. In the method, RACH preamble configuration information may be reused in an SI preamble index and/or resource information of the introduced system information preamble SI preamble.

Figure 2:
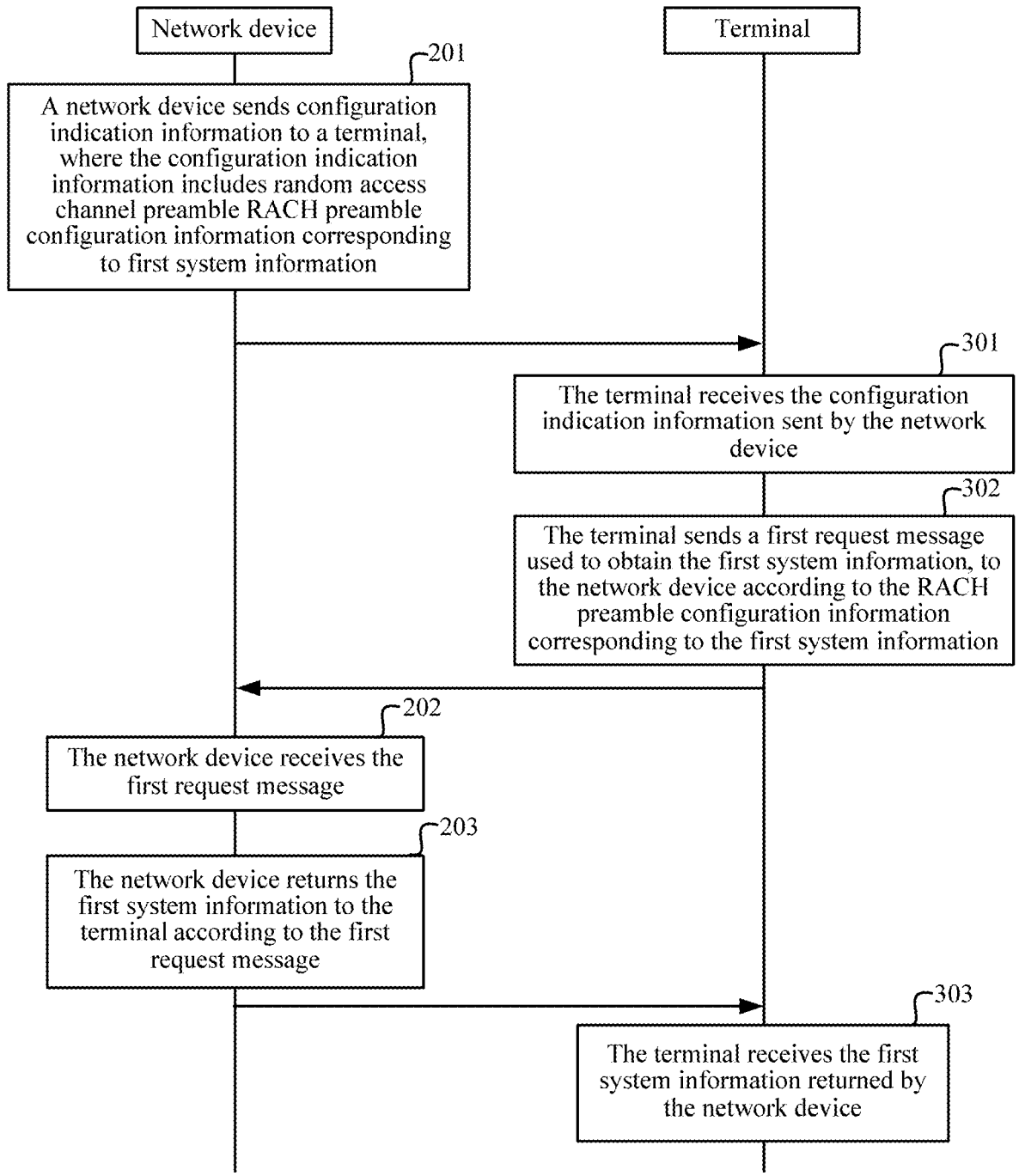
FIG. 2 is a schematic diagram of a procedure corresponding to a system information obtaining and sending method according to this application.

FIG. 2 is a schematic diagram of a procedure corresponding to a system information obtaining and sending method according to this application. This method may be implemented by using the system architecture shown in FIG. 1. As shown in FIG. 2, the method includes the following steps:

Step 201: A network device sends configuration indication information to a terminal, where the configuration indication information includes random access channel preamble RACH preamble configuration information corresponding to first system information.

Step 301: The terminal receives the configuration indication information sent by the network device.

Step 302: The terminal sends a first request message used to obtain the first system information, to the network device according to the RACH preamble configuration information corresponding to the first system information.

Step 202: The network device receives the first request message.

Step 203: The network device returns the first system information to the terminal according to the first request message.

Step 303: The terminal receives the first system information returned by the network device.

Step 201 to step 203 form a schematic diagram of a procedure (a procedure performed by the terminal) corresponding to a system information obtaining method in an embodiment of this application. Step 301 to step 303 form a schematic diagram of a procedure (a procedure performed by the network device) corresponding to a system information sending method in an embodiment of this application.

It should be noted that numbers of the foregoing steps are described as an example in an execution process, and a specific sequence of the steps is not explicitly limited in this embodiment of this application.

In this embodiment of this application, the terminal sends the first request message used to obtain the first system information, to the network device according to the RACH preamble configuration information corresponding to the first system information and included in the configuration indication information, so that the RACH preamble configuration information is reused in the first request message, thereby greatly reducing system resources occupied by a request message of the first system information.

It should be noted that the first system information in this application may be the other SI described above, and correspondingly, the first request message used to obtain the first system information may be an SI preamble.

The following describes an example in which the first system information is other SI, and the first request message is an SI preamble.

In this embodiment of the present invention, the network device may dynamically adjust the configuration indication information. For example, the network device may adjust the configuration indication information based on a quantity of messages for requesting the other SI that are counted in a first specified time segment. Details are not limited.

In step 201, the network device may send the configuration indication information to the terminal when determining, based on a first specified time period, that a time interval of the first specified time period is reached. Alternatively, the network device may send new configuration indication information to the terminal after determining that the configuration indication information changes. For example, the network device adjusts the configuration indication information based on the quantity of messages for requesting the other SI that are counted in the first specified time segment, and may send the adjusted configuration indication information to the terminal.

To more properly configure resources, in this embodiment of the present invention, the other SI may be further classified. Specifically, the network device may count, in a second specified time segment, a quantity of times of requesting each piece of other SI by the terminal. Based on the quantity, the network device may classify the other SI into two types, common system information common other SI and dedicated system information dedicated other SI. The common other SI is other SI for which a quantity of times of requesting is greater than a time threshold, namely, other SI frequently requested; the dedicated other SI is other SI for which a quantity of times of requesting is less than or equal to the time threshold, namely, other SI less frequently requested. Alternatively, the common other SI may be other SI for which a quantity of times of requesting is greater than or equal to the time threshold; the dedicated other SI is other SI for which a quantity of times of requesting is less than the time threshold. The time threshold may be set by persons skilled in the art based on experience. Because the common other SI is requested frequently, the terminal may send the first request message to the network device by using the RACH preamble configuration information; because the dedicated other SI is requested less frequently, the terminal may send the request message to the network device by using dedicated signaling (RRC signaling). In the foregoing manner, different manners of sending the request message are configured based on different quantities of times of requesting, so that the two manners of sending the request message are flexibly configured, thereby increasing network resource utilization.

Further, the network device may send type indication information to the terminal when determining, based on a second specified time period, that a time interval of the second specified time period is reached. Alternatively, the network device may send new type indication information to the terminal after determining that the type indication information changes. For example, the network device updates a type of each piece of other SI (the common other SI and the dedicated other SI), based on a statistical result in the second specified time segment or based on a content size of the other SI, and may send the updated type indication information to the terminal.

The type indication information includes a type of the first system information, and may specifically include identification information of the other SI and a corresponding type label value. The identification information of the other SI is used to uniquely identify a piece of other SI, and the type label value is used to indicate whether a type of the other SI is common other SI (or whether the other SI is common other SI). For example, in a first setting, if the other SI is common other SI, the type label value is "1" or "TRUE"; and if the other SI is dedicated other SI, the type label value is "0" or "FALSE". Alternatively, in a second setting, if the other SI is dedicated other SI, the type label value is "1" or "TRUE"; and if the other SI is common other SI, the type label value is "0" or "FALSE". The present invention provides description by using the first setting as an example. The type indication information may be in a form of a table. Table 1c shows an example of a part of content of the type indication information.

TABLE 1c

Example of a part of type indication information

| Identification information of other SI | Type label value |
| --- | --- |
| Other SI 5 | 1 |
| Other SI 6 | 1 |
| Other SI 7 | 0 |
| Other SI 8 | 0 |
| Other SI 9 | 1 |
| Other SI 10 | 0 |

In the foregoing description, the first specified time segment and the second specified time segment may be the same or different. Similarly, the first specified time period and the second specified time period may be the same or different. Details are not limited.

In this application, the foregoing type indication information may be separately sent to the terminal by the network device, or the type indication information may be included in the configuration indication information and directly sent to the terminal by using the configuration indication information.

In step 301 and step 302, after determining that the other SI needs to be obtained, the terminal may determine, based on the type indication information, whether the other SI is common other SI. Specifically, the terminal may determine, based on Table 1, whether the label value corresponding to the identification information of the other SI is "1", and if yes, determine that the other SI is common other SI and send the first request message to the network device by using the RACH preamble configuration information according to the configuration indication information; otherwise, send the first request message to the network device by using the dedicated signaling (RRC signaling).

In this application, the configuration indication information may include the RACH preamble configuration information corresponding to the first system information (the other SI), so that after receiving the configuration indication information, the terminal may send the request message used to obtain the other SI, by using the RACH preamble configuration information corresponding to the first system information (the other SI). If content of the RACH preamble configuration information corresponding to the first system information and included in the configuration indication information is different, mechanisms of sending the first request message by the terminal are different. The RACH preamble configuration information corresponding to the first system information and included in the configuration indication information is reused RACH preamble configuration information.

Specifically, the RACH preamble configuration information corresponding to the first system information may be random access channel preamble index RACH preamble index information corresponding to the first system information and/or RACH preamble-occupied resource information corresponding to the first system information. In this case, the terminal may send the first request message used to obtain the first system information, by using the RACH preamble index information corresponding to the first system information and/or the RACH preamble-occupied resource information corresponding to the first system information. In an implementation, the RACH preamble index information corresponding to the first system information is preamble indication information reserved in a RACH preamble index; and the RACH preamble-occupied resource information corresponding to the first system information is resource information reserved in the RACH preamble-occupied resource information. The reserved preamble indication information is reused preamble indication information, and the reserved resource information is reused resource information. Alternatively, the RACH preamble configuration information corresponding to the first system information may be other configuration information of a RACH preamble corresponding to the first system information. In this case, the terminal may send the first request message used to obtain the first system information, by using the other configuration information of the RACH preamble corresponding to the first system information.

This application only describes a case in which the RACH preamble configuration information corresponding to the first system information and included in the configuration indication information is the RACH preamble index information and/or the RACH preamble-occupied resource information corresponding to the first system information; in other words, the terminal sends the first request message used to obtain the first system information, by using the RACH preamble index information and/or the RACH preamble-occupied resource information corresponding to the first system information.

Case 1: The RACH preamble configuration information corresponding to the first system information is the RACH preamble index information corresponding to the first system information, and the terminal sends the first request message to the network device according to the RACH preamble index information corresponding to the first system information. In this case, a preamble index used by the terminal to send the first request message is reused RACH preamble index information, and a used resource is independent.

The RACH preamble index information is a type of information in the RACH preamble configuration information. The RACH preamble index information corresponding to the first system information (the other SI) may be the preamble indication information reserved in the RACH preamble index information, that is, the configuration indication information may include the preamble indication information reserved in the RACH preamble index information; and the reserved preamble indication information is a part of or all of preamble indication information in the RACH preamble index information.

It should be noted that, the configuration indication information including the preamble indication information reserved in the RACH preamble index may mean that the configuration indication information includes a correspondence between the preamble indication information reserved in the RACH preamble index and the other SI, or may mean that the configuration indication information includes only the preamble indication information reserved in the RACH preamble index.

In this application, the correspondence between the preamble indication information reserved in the RACH preamble index and the other SI may be configured by the network device and sent to the terminal by using the configuration indication information. In this case, the configuration indication information includes the correspondence between the preamble indication information reserved in the RACH preamble index and the other SI. Alternatively, the correspondence between the preamble indication information reserved in the RACH preamble index and the other SI may be agreed upon by the terminal and the network device in advance. In this case, the configuration indication information may include only the preamble indication information reserved in the RACH preamble index. The preamble indication information reserved in the RACH preamble index is reserved for the terminal to send a corresponding other SI request. Therefore, the preamble indication information reserved in the RACH preamble index can no longer be used in a random access RACH process.

(1) The Configuration Indication Information Includes the Correspondence Between the Preamble Indication Information Reserved in the RACH Preamble Index and the Other SI.

After determining the correspondence between the preamble indication information reserved in the RACH preamble index and the other SI, the network device stores the correspondence, and sends the correspondence to the terminal by using the configuration indication information. Specifically, the correspondence between the preamble indication information and the other SI may be stored and sent in a plurality of forms, for example, in a form of a table. Table 2a shows an example of a part of content of the correspondence between the preamble indication information and the other SI.

TABLE 2a

Example of a part of content of a correspondence between preamble indication information and other SI

| Identification information of other SI | Corresponding preamble indication information |
|---|---|
| Other SI 5 | Preamble index 1 |
| Other SI 6 | Preamble index 2 |
| Other SI 7 | Preamble index 3 |

TABLE 2a-continued

Example of a part of content of a correspondence between preamble indication information and other SI

| Identification information of other SI | Corresponding preamble indication information |
|---|---|
| Other SI 8 | Preamble index 4 |
| Other SI 9 | Preamble index 5 |
| Other SI 10 | Preamble index 6 |

In this case, the preamble indication information reserved in the RACH preamble index is preamble indexes 1 to 6, and therefore, the preamble indexes 1 to 6 in the RACH preamble index can no longer be used in a random access process.

Alternatively, if the other SI is further classified into common other SI and dedicated other SI, it may be understood that in this case, the correspondence between the preamble indication information and the other SI may indicate only a correspondence between the preamble indication information and the common other SI. Table 2b shows an example of a part of content of the correspondence between the preamble indication information and the common other SI.

TABLE 2b

Example of a part of content of a correspondence between preamble indication information and common other SI

| Identification information of other SI | Corresponding preamble indication information |
|---|---|
| Other SI 5 | Preamble index 1 |
| Other SI 6 | Preamble index 2 |
| Other SI 9 | Preamble index 3 |

In this case, the preamble indication information reserved in the RACH preamble index is preamble indexes 1 to 3, and therefore, the preamble indexes 1 to 3 in the RACH preamble index can no longer be used in a random access process.

In step 302, the terminal may determine target preamble indication information corresponding to the other SI, based on the correspondence between the preamble indication information and the other SI. For example, if the other SI is other SI 5, the terminal may determine, based on Table 2a or Table 2b, that the target preamble indication information is a preamble index 1. Then, when the terminal needs to obtain the other SI 5, the terminal sends a first request message to the network device. The first request message includes the target preamble indication information (that is, the preamble index 1). When the other SI is other SI 7, if the other SI is no longer classified, as the case in Table 2a, the terminal may determine, based on Table 2a, that the target preamble indication information is a preamble index 3. Then, when the terminal needs to obtain the other SI 7, the terminal sends a first request message to the network device. The first request message includes the target preamble indication information (that is, the preamble index 3). If the other SI is further classified, as the case in Table 2b, the terminal may determine, based on Table 1, that the other SI 7 is dedicated other SI. Then, when the terminal needs to obtain the other SI 7, the terminal sends a first request message to the network device. The first request message needs to be sent by using RRC signaling. Specifically, the RRC signaling may carry indication information of the other SI 7, and may further carry identification information of the UE.

It may be understood that, if the UE requests other SI not supported by a current network, the network device may return an other SI request failure response message to the terminal, and the response message carries a cause value of "not supported" or "error".

Correspondingly, in step 202 and step 203, the network device receives the first request message; determines the other SI (that is, the other SI 5) corresponding to the target preamble indication information (that is, the preamble index 1), based on the target preamble indication information (that is, the preamble index 1) included in the first request message and Table 2a or Table 2b; and then, sends the other SI (that is, the other SI 5) to the terminal by using a response message. Therefore, in step 303, the terminal may obtain the other SI (that is, the other SI 5) according to the response message returned by the network device.

It should be noted that the network device may configure a correspondence between the preamble indication information and all other SI. The configuration indication information includes the correspondence between the preamble indication information and all the other SI, and in this case, the terminal may determine, based on the type indication information, whether to send the first request message used to obtain the other SI, according to the configuration indication information. For example, if the terminal intends to obtain the other SI 7, after the terminal determines, based on the type indication information, that the other SI 7 is dedicated other SI, the terminal may send a request message used to obtain the other SI 7, by using the RRC signaling. Alternatively, the terminal may directly send an SI preamble according to a preamble index 3 corresponding to the other SI 7 in Table 2a, to obtain the other SI 7.

The network device may determine common other SI based on a type of the other SI, and configure a correspondence between the preamble indication information and the common other SI. In this case, the configuration indication information includes the correspondence between the preamble indication information and the common other SI. In this case, after receiving the configuration indication information, the terminal may determine, based on the correspondence, whether the other SI has corresponding preamble indication information. If the other SI has corresponding preamble indication information, it indicates that the other SI is common other SI, and the first request message may be sent according to the configuration indication information (for details, refer to the foregoing description). If the other SI has no corresponding preamble indication information, it indicates that the other SI is dedicated other SI, and a request message may be sent by using dedicated signaling. It may be understood that, if the UE requests other SI not supported by a current network, the network device may return an other SI request failure response message to the terminal, and the response message may carry a cause value of "not supported" or "error". In such a manner, the network device may not need to send the type indication information to the terminal, thereby greatly reducing transmission resources.

In this application, the network device may add the type indication information to the configuration indication information, and directly send the type indication information to the terminal by using the configuration indication information. Table 2c shows an example in which the configuration indication information includes the type indication information.

TABLE 2c

Example in which configuration indication information includes type indication information

| Identification information of other SI | Type label value | Corresponding preamble indication information |
|---|---|---|
| Other SI 5 | 1 | Preamble index 1 |
| Other SI 6 | 0 | None |
| Other SI 7 | 0 | None |

In this embodiment of the present invention, the RACH preamble configuration information corresponding to the first system information (the other SI) is RACH preamble index information corresponding to a system information group in which the first system information (the other SI) is located. One system information group may include one or more system information blocks.

Specifically, in consideration that there may be a plurality of pieces of other SI, and limited preamble indication information reserved in the RACH preamble index, to more properly set a correspondence between the preamble indication information and the other SI, the network device may classify the other SI, and specifically classify the other SI based on a service type, usage, or the like. Each other SI group obtained after classification includes at least one piece of other SI. For example, a group 1 and a group 2 are obtained after other SI 5, other SI 6, and other SI 9 are grouped. The group 1 includes the other SI 5 and the other SI 6, and the group 2 includes the other SI 9. In this case, the network device may configure a correspondence between an other SI group and other SI, and send the correspondence to the terminal by using configuration indication information. Alternatively, a correspondence between an other SI group and other SI may be agreed upon by the terminal and the network device in advance. The network device may further configure a correspondence between preamble indication information and an other SI group, and send the correspondence to the terminal by using configuration indication information. Alternatively, a correspondence between preamble indication information and an other SI group may be agreed upon by the terminal and the network device in advance. Table 3 shows an example of a part of a correspondence among an other SI group, other SI, and preamble indication information.

TABLE 3

Example of a part of content of a correspondence

| Other SI group | Other SI in a group | Corresponding preamble indication information |
|---|---|---|
| Group 1 | Other SI 5, other SI 6 | Preamble index 1 |
| Group 2 | Other SI 9 | Preamble index 3 |

In this case, the preamble indication information reserved in the RACH preamble index is preamble indexes 1 and 3, and therefore, the preamble indication information 1 and 3 in the RACH preamble index can no longer be used in a random access process.

After configuring the correspondence (for example, the content in Table 3) between the preamble indication information and the other SI group, the network device stores the correspondence, and sends the correspondence to the terminal by using the configuration indication information. Alternatively, after grouping the other SI, the network device notifies the terminal of group information. For example, the group information is that the group 1 includes the other SI 5 and the other SI 6, and the group 2 includes the other SI 9. Then, after determining the correspondence between the preamble indication information and the other SI group, the network device notifies the terminal of correspondences between the group 1 and the preamble index 1 and between the group 2 and the preamble index 2. This is not limited in this application.

If the foregoing grouping manner is used, in step 302, the terminal may first determine a target other SI group in which the other SI is located, and determine, based on the correspondence between the preamble indication information and the other SI group, preamble indication information corresponding to the target other SI group. In this case, the terminal may use the preamble indication information corresponding to the target other SI group as target preamble indication information, and send, to the network device, a first request message carrying the target preamble indication information. For example, the other SI is the other SI 5, and the terminal may determine that a group in which the other SI 5 is located is the group 1, to determine that the target preamble indication information is the preamble index 1.

Correspondingly, in step 202 and step 203, the network device obtains the other SI group (that is, the group 1) corresponding to the target preamble indication information (that is, the preamble index 1), according to the correspondence between the preamble indication information and the other SI group. In this case, the network device may send all other SI in the group 1 to the terminal by using a response message, or obtain the other SI from the group 1 and send the other SI to the terminal. Therefore, in step 303, the terminal may obtain the other SI according to the response message returned by the network device.

(2) The Configuration Indication Information Includes the Preamble Indication Information Reserved in the RACH Preamble Index.

After determining the preamble indication information reserved in the RACH preamble index, the network device stores the preamble indication information, and sends the preamble indication information to the terminal by using the configuration indication information. Specifically, the preamble indication information may be stored and sent in a plurality of forms, for example, in a form of a table. Table 4 shows an example of a part of content of the preamble indication information.

TABLE 4

Example of a part of content of preamble indication information
Preamble indication information Preamble index 1
Preamble index 2
Preamble index 3

In this case, the preamble indication information reserved in the RACH preamble index is preamble indexes 1 to 3, and therefore, the preamble indication information 1 to 3 in the RACH preamble index can no longer be used in a random access process.

In step 302, the terminal may first determine common other SI based on received type indication information. For example, the terminal may determine, based on the content in Table 1, that the common other SI is other SI 5, other SI 6, and other SI 9. Then, the terminal maps, according to a preset rule, the determined common other SI to the preamble indication information that is included in the configuration indication information, to obtain a correspondence between the preamble indication information and the common other SI. The preset rule may be agreed upon by the terminal and the network device in advance. For example, the preset rule is that the preamble indication information is mapped to the common other SI according to a sequence relationship therebetween. The terminal obtains the following relationships based on the preset rule: The other SI 5 corresponds to the preamble index 1, the other SI 6 corresponds to the preamble index 2, and the other SI 9 corresponds to the preamble index 3.

After determining the correspondence between the preamble indication information and the other SI, the terminal may determine the target preamble indication information corresponding to the other SI, based on the correspondence between the preamble indication information and the other SI, and send the first request message.

Correspondingly, in step 202 and step 203, the network device may determine the other SI corresponding to the target preamble indication information, based on the target preamble indication information included in the first request message and the correspondence, and send the other SI to the terminal by using a response message. Therefore, in step 303, the terminal may obtain the other SI.

Case 2: The RACH preamble configuration information corresponding to the first system information is the RACH preamble-occupied resource information corresponding to the first system information, and the terminal sends the first request message to the network device by using the RACH preamble-occupied resource information corresponding to the first system information. In this case, a preamble index used by the terminal to send the first request message is independent, and a used resource is reused RACH preamble-occupied resource information.

The RACH preamble-occupied resource information is a type of information in the RACH preamble configuration information. The RACH preamble-occupied resource information corresponding to the first system information (the other SI) may be resource information reserved in the RACH preamble-occupied resource information, that is, the configuration indication information may include the resource information reserved in the RACH preamble-occupied resource information, and the reserved resource information is a part of or all of resource information in the RACH preamble-occupied resource information.

It should be noted that for the resource information reserved in the RACH preamble-occupied resource information, the terminal no longer uses the reserved resource information when initiating a random access RACH.

Specifically, the reserved resource information may include a reserved time domain resource, or a reserved time domain resource and a frequency domain resource corresponding to the reserved time domain resource. The network device may respectively indicate the reserved time domain resource and the frequency domain resource corresponding to the reserved time domain resource, by using a system information time domain offset SI-TimeOffset and a system information frequency domain offset SI-FrequencyOffset. In a case, the reserved resource information includes the reserved time domain resource. Table 5a shows an example of reserved time-frequency resource information.

TABLE 5a

Example of reserved time-frequency resource information
SI-TimeOffset

N

In Table 5a, a specific value or a value range of N may be set by the network device. SI-TimeOffset represents a time domain resource that is in a time domain resource of the RACH preamble-occupied resource information and that may be used to send an SI preamble. The time domain resource may include a system frame, or a system frame and subframe information in the system frame. In this case, all frequency domain resources corresponding to time-frequency resources in the RACH preamble-occupied resource information may be used to send an SI preamble.

In another case, the reserved resource information includes a reserved time domain resource and a frequency domain resource corresponding to the reserved time domain resource. Table 5b shows an example of a reserved time domain resource and a frequency domain resource corresponding to the reserved time domain resource.

TABLE 5b

Example of a reserved time domain resource and a frequency domain resource corresponding to the reserved time domain resource

| SI-TimeOffset | SI-FrequencyOffset |
|---|---|
| N | M |

In Table 5b, specific values or value ranges of N and M may be set by the network device. SI-TimeOffset represents a time domain resource that is in a time domain resource of the RACH preamble-occupied resource information and that may be used to send an SI preamble. The time domain resource may include a system frame, or a system frame and subframe information in the system frame. SI-frequencyoffset represents a frequency domain resource that may be used on the foregoing time domain resource. If the configuration indication information does not carry a value of SI-frequencyoffset, it is considered by default that the terminal may use all frequency domain resources corresponding to the foregoing time domain resources in the RACH preamble-occupied resource information to send an SI preamble.

It may be understood that, the system information time domain offset SI-TimeOffset and the system information frequency domain offset SI-FrequencyOffset are indicated based on the RACH preamble-occupied resource information. Based on the SI-TimeOffset, the system information frequency domain offset SI-FrequencyOffset, and the RACH preamble-occupied resource information, the terminal may obtain resource information reserved in the RACH preamble-occupied resource information and used to send an SI preamble.

Figure 3A:
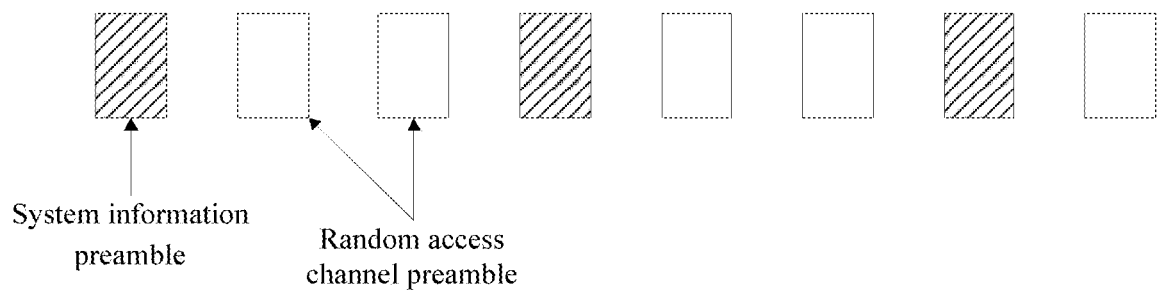
FIG. 3a is a schematic diagram of a case of initiating a first request message according to this application.

For example, the reserved resource information includes a reserved time domain resource (as shown in Table 5a), a value of N is 3, and the first request message may be initiated at a time point whose system frame number is an integer multiple of 3. FIG. 3a is a schematic diagram of a case of initiating the first request message.

Figure 3B:
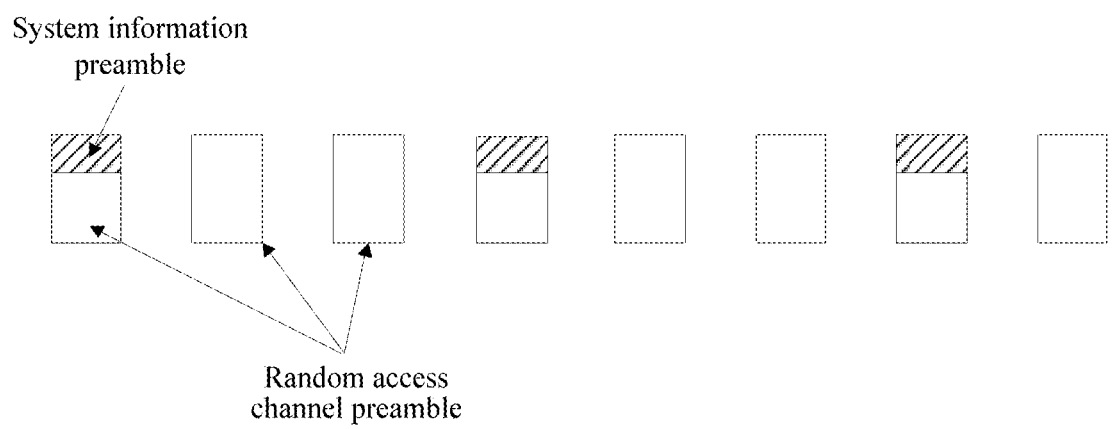
FIG. 3b is a schematic diagram of another case of initiating a first request message according to this application.

The reserved resource information includes a reserved time domain resource and a frequency domain resource corresponding to the reserved time domain resource (as shown in Table 5b). If a value of N is 3 and a value of M is not set, the first request message may be initiated on a frequency domain resource corresponding to an entire time domain resource, as shown in FIG. 3a. If a value of N is 3, and a value of M falls within a range, the first request message can be initiated only in a frequency domain resource range corresponding to the time domain resource. FIG. 3b is a schematic diagram of another case of initiating the first request message.

In step 302, the terminal may send the first request message to the network device by using a resource in the reserved resource information. The first request message may carry an independent preamble index. Correspondingly, in step 202 and step 203, the network device may receive, according to the reserved resource information, the first request message that is sent by the terminal by using the reserved resource information, and return the other SI to the terminal according to the independent preamble index. Therefore, in step 303, the terminal may obtain the other SI.

Case 3: The RACH preamble configuration information corresponding to the first system information is the RACH preamble index information corresponding to the first system information and the RACH preamble-occupied resource information corresponding to the first system information. The terminal sends the first request message to the network device according to the RACH preamble index information corresponding to the first system information and the RACH preamble-occupied resource information corresponding to the first system information. In this case, both a preamble index and a resource used by the terminal to send the first request message is reused RACH preamble configuration information.

As pointed out in Case 1 and Case 2, the RACH preamble index information corresponding to the first system information (the other SI) may be the preamble indication information reserved in the RACH preamble index information, and the RACH preamble-occupied resource information corresponding to the first system information (the other SI) may be the resource information reserved in the RACH preamble-occupied resource information. Correspondingly, the configuration indication information may include a correspondence between the preamble indication information reserved in the RACH preamble index and the other SI (or the preamble indication information reserved in the RACH preamble index), and the resource information reserved in the RACH preamble-occupied resource information.

Specifically, the configuration indication information may include content of the configuration indication information in Case 1 and Case 2, and the content is not listed one by one herein. Only an example in which the configuration indication information includes the preamble indication information reserved in the RACH preamble index and the resource information reserved in the RACH preamble-occupied resource information is used for description. Table 6 shows an example of a part of content of the configuration indication information.

TABLE 6

Example of a part of content of configuration indication information

| SI-TimeOffset | SI-FrequencyOffset | Preamble indication information |
|---|---|---|
| N | M | Preamble index (0 to 4) |

Based on Table 6, for example, a value of N is 3, and no value is configured for M, or a value set to "all" or "infinitely large" is configured for M. Then, the first request message may be initiated at a time point whose system frame number in the RACH preamble-occupied resource information is an integer multiple of 3, and preamble indexes (0 to 4) may be initiated on all frequency domain resources that are of the RACH resource and that correspond to the foregoing time domain resources.

It should be noted that the time-frequency resource reserved in the RACH preamble-occupied resource information may be only used to send a preamble index of an SI request. That is, on a time-frequency resource that is reserved to send an SI request and that is on a RACH resource, the preamble indexes (0 to 4) may be only used to send an SI preamble. On another RACH time-frequency resource, the preamble indexes (0 to 4) may still be used to initiate a RACH request.

In this application, the configuration indication information may further include other information, for example, information used to indicate a preamble format (Preamble format) that can be used by the terminal. Details are not limited.

It should be noted that, as can be learned from the foregoing description of this application, the network device may determine a manner of sending a piece of other SI, based on a quantity of first request messages sent by UE and received within a time segment, a type of the UE, a capability of the UE, a service type of the UE, another network policy, or the like.

The network device determines, based on a quantity of first request messages sent by the UE and received within a time segment, that the first system information is sent by broadcast. To enable the terminal to receive the broadcast first system information, the network device needs to first instruct the terminal by paging to read updated system information, to obtain scheduling information of the first system information. The network device sends the scheduling information to the terminal. The scheduling information may include a time-frequency resource of the first system information sent by the network device, to instruct the terminal to receive the broadcast first system information on the corresponding time-frequency resource. The scheduling information in this application may alternatively include other information based on an actual requirement, for example, at least one of: a period of sending the first system information by the network device by broadcast, a time-frequency resource, a valid broadcast time range, or other information. Details are not limited.

The following describes an example for specific description.

The configuration indication information sent by the network device is shown in Table 7a. The other SI 5 is common other SI and corresponding preamble indication information is a preamble index 1, and the other SI 6 is dedicated other SI and has no corresponding preamble indication information.

TABLE 7a

Example of configuration indication information

| Identification information of other SI | Type label value | Corresponding preamble indication information |
|---|---|---|
| other SI 5 | 1 | preamble index 1 |
| other SI 6 | 0 | None |

It can be learned from content in Table 7a that, if needing to obtain the other SI 5, the terminal may initiate an SI preamble, and if needing to obtain the other SI 6, the terminal may initiate a request by using RRC signaling.

The network device may determine a manner of sending the other SI, depending on whether a quantity of messages for requesting the other SI that are counted in a time segment exceeds a threshold. A running time of T1 may be configured by the network device, and a running length of T1 is less than a time that the network device determines to update broadcast scheduling information. A mechanism in which a network device in 4G periodically updates system information is used as an example. That is, the network device can update the system information only in a next system information modification period (SI modification period). For example, T1 is 20 ms, and an SI modification period is 40 ms. The T1 length is less than the SI modification period length of 40 ms, so that a time is reserved for sending a paging message. When the SI modification period (40 ms) starts, T1 starts running. In the T1 range, if the network device determines that a received quantity of times of requesting the other SI 6 is greater than a third threshold, the network device determines that the other SI 6 is sent by broadcast. The network device may update scheduling information in the system information, so that the updated scheduling information in the system information carries scheduling information of the other SI 6, to instruct the terminal to receive the other SI 6 at a corresponding location. The network device further needs to send a paging message to notify the terminal that the system information changes, so that the terminal reads updated system information. Optionally, the paging message may carry a reason why the system information changes, for example, to instruct to start broadcasting the other SI 6. Table 7b shows an example of the scheduling information. The scheduling information includes at least one type of information of: a period, a time-frequency resource, and a valid broadcast time range.

TABLE 7b

Example of scheduling information

| Identification information of other SI | | Example |
|---|---|---|
| Other SI 6 | >Period | >20 ms |
| | >Time-frequency resource | >Time frequency location |
| | >Valid broadcast time range, for example, an SFN range | >SFN range: 4 to 11 |

Specifically, the network device pages the terminal in a current SI modification period 1 (system frame number System Frame Number, SFNs 0 to 3), and indicates that "the first system information is sent by broadcast (the other SI 6 is sent by broadcast)". When a next SI modification period 2 (SFNs 4 to 7) starts, the network device needs to update the scheduling information of the other SI 6 carried in the scheduling information of the system information, based on a valid broadcast time range in the scheduling information of the other SI 6. A valid time of the scheduling information of the other SI 6 lasts until an SI modification period 3 ends, that is, lasts to an SFN 11. In other words, a sending time of the scheduling information including the other SI 6 is the SI modification periods 2 and 3, that is, SFNs 4 to 11. In this case, the network device needs to page the terminal in the SI modification period 1 (SFNs 0 to 3), and notifies the terminal that the configuration indication information changes. Paging needs to carry a paging cause, for example, information about a changed other SI. If having a requirement on the other SI 6, UE that receives paging continues to receive the scheduling information that is of the other SI 6 and that is sent by the network device in the SI modification periods 2 and 3 (SFNs 4 to 11), and further, receives the other SI 6 at a corresponding time frequency location.

Correspondingly, a terminal that initiates a request in the SI modification period 1 (SFNs 0 to 3) and a terminal that has a requirement on the other SI 6 receive the other SI 6 at a corresponding time frequency location in the SI modification periods 2 and 3 (SFNs 4 to 11). For a terminal awoken in the SI modification periods 2 and 3 (SFNs 4 to 11), the terminal finds, based on received scheduling information, that the network device is broadcasting the other SI 6. If the terminal also needs to read the other SI 6, the terminal may first attempt to receive the other SI 6 at a latest time frequency location. If the terminal reads the other SI 6, the terminal does not initiate a request; or if the terminal does not read the other SI 6, the terminal initiates a request and continues to attempt to receive the other SI 6 at the latest time frequency location.

When the valid time of the other SI 6 broadcast by the network device expires (when the SFN is greater than 11), for the terminal that has previously read the scheduling information of the other SI 6 in the SI modification periods 2 and 3 (SFNs 4 to 11), the terminal may know that the broadcast time of the other SI 6 ends. For example, the terminal reads that the valid broadcast time range of the other SI 6 is SFNs 4 to 11, and when the UE finds that a current SFN is greater than 11, the terminal may determine that the broadcast time of the other SI 6 ends. If the terminal has a requirement again, the terminal may re-initiate a request. For the terminal that has not read broadcast information of the other SI 6, in other words, for the terminal that has not read the scheduling information of the other SI 6 in the SFNs 4 to 11, if the terminal has a requirement, the terminal may also initiate a request.

Then, the scheduling information of the other SI 6 in the scheduling information is invalid, that is, the content in Table 7b is invalid. The network device needs to delete the scheduling information of the other SI 6 and update the scheduling information. It should be noted that in this application, if this scheduling information changes, the network device may notify the UE by paging or the network device may not notify the UE.

In this embodiment, the mechanism in which the network device in 4G updates the system information is used as an example. However, the present invention is not limited to the mechanism.

In the foregoing embodiment of this application, the terminal receives the configuration indication information sent by the network device, and sends the first request message used to obtain the other SI, to the network device according to the configuration indication information by using the RACH preamble configuration information, to obtain the other SI returned by the network device. The terminal sends the message for requesting the other SI to the network device by using the RACH preamble configuration information, so that the RACH preamble configuration information is reused in the message for requesting the other SI, thereby greatly reducing system resources occupied by the message for requesting the other SI.

In this application, the system information usually includes mobility-related information (mobility-related SI). The mobility-related SI is usually information about a neighboring system and inter-frequency or intra-frequency neighboring cells. This application introduces a concept of a mobility-related information resource pool. That is, information about all cells in an area scope is referred to as a mobility-related information resource pool, which may be classified into common mobility system information common mobility SI. The common mobility SI may be valid in an area scope, and the area scope has a corresponding area scope identification that is used to identify different area scopes. The area scope includes at least one cell. Further, the cells in the area scope may belong to a same standard or different standards.

It is set that all cells in an area scope belong to one mobility-related information resource pool, to form common mobility SI. From the perspective of the terminal, the cells in the resource pool are classified into a serving cell and neighboring cells of the terminal. That is, relative to the terminal, the serving cell and the neighboring cells in the common mobility SI of the terminal need to be adjusted based on a change of the serving cell of the terminal. When the serving cell of the terminal changes, for example, changes from a cell 1 to a cell 2, the terminal may use the new serving cell (that is, the cell 2) as a current serving cell, and place the previous serving cell (that is, the cell 1) into the resource pool again. That is, the information about the serving cell and the neighboring cells in the common mobility SI of the terminal needs to be correspondingly updated.

Based on the foregoing resource pool, a scenario is set, and after the terminal moves from a cell 1 in a first area scope (area scope 1) to a cell 2 in the first area scope, adjustment is made on the terminal side in this application, so that the common mobility SI may still be valid, and the terminal does not need to re-initiate a request message in the cell 2 to obtain new common mobility SI.

(1) Common Mobility SI in One Standard (Intra-RAT) May Include at Least One of: Frequency Information (Freq), Cell Information (Cell), and a Beam.

Assuming that the terminal is in the cell 1 in the first area scope (area scope 1), after the terminal requests to obtain system information, the terminal obtains intra-RAT common mobility SI (that is, information before update) shown in Table 8a. Table 8a shows an example of a part of content of common mobility SI information before update.

TABLE 8a

Example of a part of content of common mobility SI information before update
Area scope 1

| Serving cell | First neighboring cell | Second neighboring cell | Third neighboring cell |
|---|---|---|---|
| Cell 1 | Cell 2 | Cell 3 | Cell 4 |

After the terminal moves to or is re-selected to the cell 2, and determines that the cell 2 is a cell in the first area scope, the terminal may update the common mobility SI based on the information in Table 8a, to obtain updated common mobility SI, as shown in Table 8b. In this case, the terminal may replace the serving cell in Table 8a with the cell 2 through adjustment, so that the terminal does not need to initiate a request message in the cell 2.

TABLE 8b

Example of a part of content of common mobility SI information after update
Area scope 1

| Serving cell | First neighboring cell | Second neighboring cell | Third neighboring cell |
|---|---|---|---|
| Cell 2 | Cell 1 | Cell 3 | Cell 4 |

(2) Common Mobility SI in Different Standards (Inter-RAT) Includes at Least Freq Information.

If the terminal is re-selected from a cell in a standard 1 in the first area scope to another cell in the standard 1 in the first area scope, the terminal may make no adjustment, and consider by default that the common mobility SI is valid.

If cells included in an area scope belong to different standards, for example, a cell 1 in a standard 1 and a cell 2 in a standard 2, when the terminal is re-selected from the cell 1 in the standard 1 in the first area scope to the cell 2 in the standard 2 in a second area scope, the terminal compares an area scope identification received in the cell 2 in the standard 2 with an area scope identification previously received in the cell 1 in the standard 1, and finds that the area scope identifications are the same. The terminal may adjust the common mobility SI, to be specific, change the serving cell into the cell 2 in the standard 2 and change the cell 1 in the standard 1 into neighboring cell information without a need to initiate a request message. If an area scope cannot be valid across standards, after the terminal is re-selected from a cell in the first area scope to a cell in the second area scope, the terminal finds that area scope identifications are different, and therefore needs to re-initiate a request to obtain new common mobility SI.

Based on the same concept, for the foregoing method procedures, the embodiments of the present invention further provide a terminal and a network device. For specific content of the terminal and the network device, refer to the foregoing method implementations.

Figure 4:
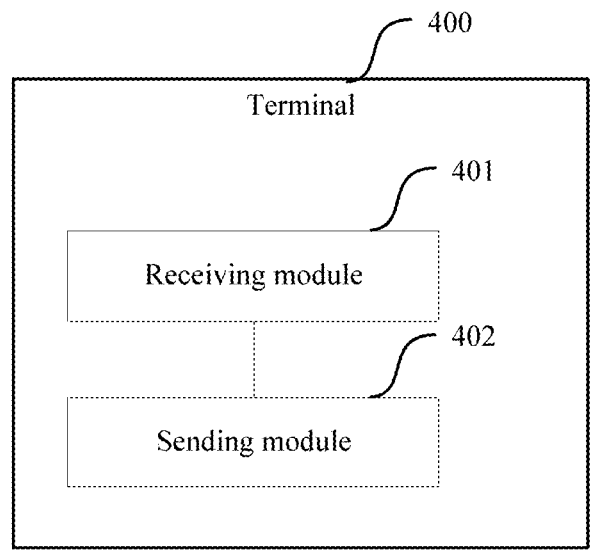
FIG. 4 is a schematic structural diagram of a terminal according to this application.

FIG. 4 is a schematic structural diagram of a terminal according to this application. The terminal is configured to perform a procedure corresponding to the foregoing system information obtaining method. As shown in FIG. 4, the terminal 400 includes: a receiving module 401, configured to receive configuration indication information sent by a network device, where the configuration indication information includes random access channel preamble RACH preamble configuration information corresponding to first system information. The terminal 400 further includes a sending module 402, configured to send a first request message used to obtain the first system information, to the network device according to the RACH preamble configuration information corresponding to the first system information. The receiving module 401 is further configured to receive the first system information that is returned by the network device according to the first request message.

Optionally, the receiving module 401 is further configured to receive type indication information sent by the network device, where the type indication information includes a type of the first system information. Before sending the first request message used to obtain the first system information, to the network device according to the RACH preamble configuration information corresponding to the first system information, the sending module 402 is further configured to: determine, based on the type indication information, that the type of the first system information is common system information.

Optionally, the sending module 402 is further configured to: if determining, based on the type indication information, that the type of the first system information is not the common system information, send, by using Radio Resource Control RRC signaling, a request message used to obtain the first system information.

Optionally, the RACH preamble configuration information corresponding to the first system information is RACH preamble index information corresponding to the first system information. The sending module 402 is specifically configured to: send the first request message to the network device according to the RACH preamble index information corresponding to the first system information, where the first request message includes the RACH preamble index information corresponding to the first system information.

Optionally, the RACH preamble configuration information corresponding to the first system information is RACH preamble index information corresponding to a system information group in which the first system information is located. The sending module 402 is specifically configured to: send the first request message to the network device according to the RACH preamble index information corresponding to the system information group in which the first system information is located, where the first request message includes the RACH preamble index information corresponding to the system information group in which the first system information is located.

Optionally, the RACH preamble configuration information corresponding to the first system information is RACH preamble-occupied resource information corresponding to the first system information. The sending module 402 is specifically configured to: send the first request message to the network device by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

Figure 5:
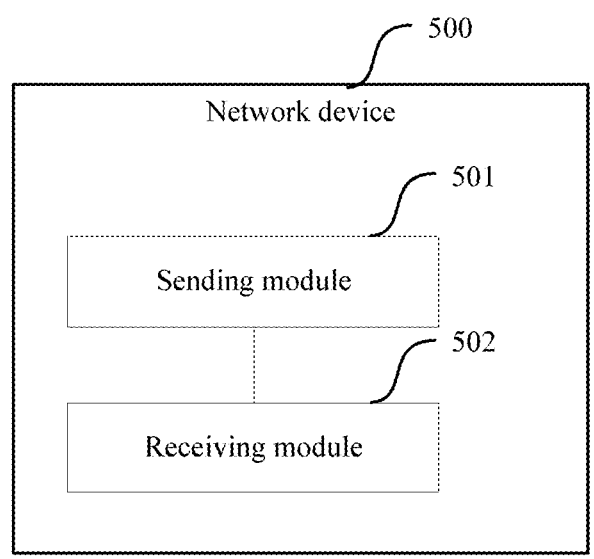
FIG. 5 is a schematic structural diagram of a network device according to this application.

FIG. 5 is a schematic structural diagram of a network device according to this application. The network device is configured to perform a procedure corresponding to the foregoing system information sending method. As shown in FIG. 5, the network device 500 includes: a sending module 501, configured to send configuration indication information to a terminal, where the configuration indication information includes random access channel preamble RACH preamble configuration information corresponding to first system information. The network device 500 further includes a receiving module 502, configured to receive a first request message that is used to obtain the first system information and that is sent by the terminal according to the RACH preamble configuration information corresponding to the first system information. The sending module 501 is further configured to return the first system information to the terminal according to the first request message.

Optionally, the sending module 501 is further configured to send type indication information to the terminal, where the type indication information includes a type of the first system information.

Optionally, the RACH preamble configuration information corresponding to the first system information is RACH preamble index information corresponding to the first system information. The sending module 501 is specifically configured to: obtain, based on RACH preamble index information included in the first request message, the first system information corresponding to the RACH preamble index information included in the first request message; and send the first system information to the terminal.

Optionally, the RACH preamble configuration information corresponding to the first system information is RACH preamble index information corresponding to a system information group in which the first system information is located. The sending module 501 is specifically configured to: obtain, based on RACH preamble index information included in the first request message, a system information group corresponding to the RACH preamble index information included in the first request message, where the system information group includes the first system information.

Optionally, the RACH preamble configuration information corresponding to the first system information is RACH preamble-occupied resource information corresponding to the first system information. The receiving module 502 is specifically configured to: receive, according to the RACH preamble-occupied resource information corresponding to the first system information, the first request message that is sent by the terminal by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

Figure 6:
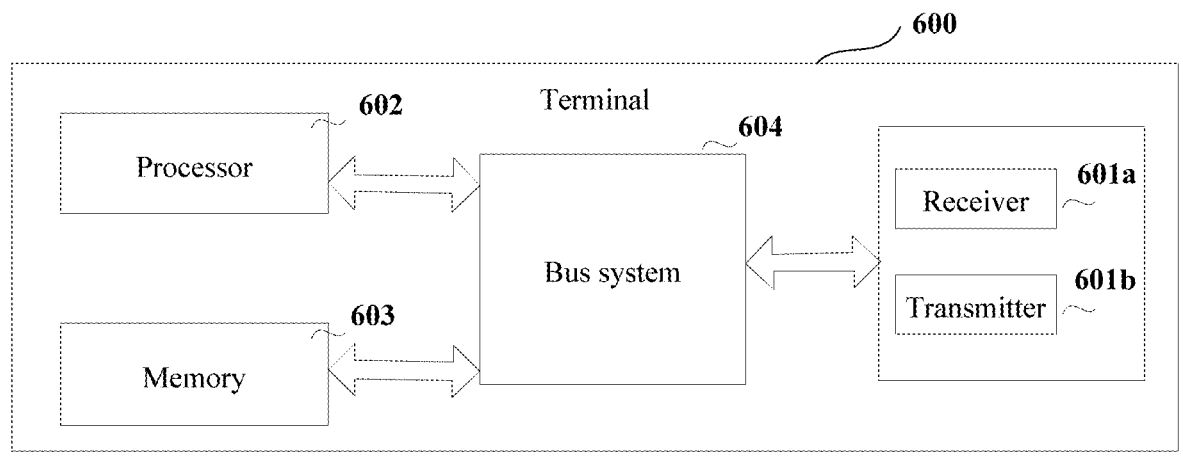
FIG. 6 is a schematic structural diagram of another terminal according to this application.

FIG. 6 is a schematic structural diagram of another terminal according to this application. The terminal is configured to perform a procedure corresponding to the foregoing system information obtaining method. As shown in FIG. 6, the terminal 600 includes: a receiver 601*a*, a transmitter 601*b*, a processor 602, a memory 603, and a bus system 604.

The memory 603 is configured to store a program. Specifically, the program may include program code, where the program code includes a computer operation instruction. The memory 603 may be a random access memory (RAM), or may be a non-volatile memory, such as at least one disk memory. Only one memory is shown in the figure. Certainly, a plurality of memories may be configured as required. Alternatively, the memory 603 may be a memory in the processor 602.

The memory 603 stores the following elements, executable modules or data structures, or a subset thereof, or an extended set thereof: operation instructions, including various operation instructions, and used to implement various operations; and an operating system, including various system programs and used to implement various basic services and process a hardware-based task.

The processor 602 controls an operation of the terminal 600, and the processor 602 may also be referred to as a CPU (central processing unit). During specific application, components of the terminal 600 are coupled together by using the bus system 604. In addition to a data bus, the bus system 604 includes a power bus, a control bus, a status signal bus, and the like. However, for clear description, various types of buses in the figure are marked as the bus system 604. For ease of representation, FIG. 6 shows only an example.

The method disclosed in the foregoing embodiments of this application may be applied to the processor 602, or may be implemented by the processor 602. The processor 602 may be an integrated circuit chip and has a signal processing capability. In an implementation process, steps in the foregoing methods can be implemented by using a hardware integrated logical circuit in the processor 602, or by using instructions in a form of software. The processor 602 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 603, and the processor 602 reads information in the memory 603 and performs the following steps in combination with hardware of the processor:

The receiver 601*a* is configured to receive configuration indication information sent by a network device, where the configuration indication information includes random access channel preamble RACH preamble configuration information corresponding to first system information. The transmitter 601*b* is configured to send a first request message used to obtain the first system information, to the network device according to the RACH preamble configuration information corresponding to the first system information. The receiver 601*a* is further configured to receive the first system information that is returned by the network device according to the first request message.

Optionally, the receiver 601*a* is further configured to receive type indication information sent by the network device, where the type indication information includes a type of the first system information. Before sending the first request message used to obtain the first system information, to the network device, the transmitter 601*b* is further configured to: determine, based on the type indication information, that the type of the first system information is common system information.

Optionally, the transmitter 601*b* is further configured to: if determining, based on the type indication information, that the type of the first system information is not the common system information, send, by using Radio Resource Control RRC signaling, a request message used to obtain the first system information.

Optionally, the RACH preamble configuration information corresponding to the first system information is RACH preamble index information corresponding to the first system information. The transmitter 601*b* is specifically configured to: send the first request message to the network device according to the RACH preamble index information corresponding to the first system information, where the first request message includes the RACH preamble index information corresponding to the first system information.

Optionally, the RACH preamble configuration information corresponding to the first system information is RACH preamble index information corresponding to a system information group in which the first system information is located. The transmitter 601*b* is specifically configured to: send the first request message to the network device according to the RACH preamble index information corresponding to the system information group in which the first system information is located, where the first request message includes the RACH preamble index information corresponding to the system information group in which the first system information is located.

Optionally, the RACH preamble configuration information corresponding to the first system information is RACH preamble-occupied resource information corresponding to the first system information. The transmitter 601*b* is specifically configured to: send the first request message to the network device by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

Figure 7:
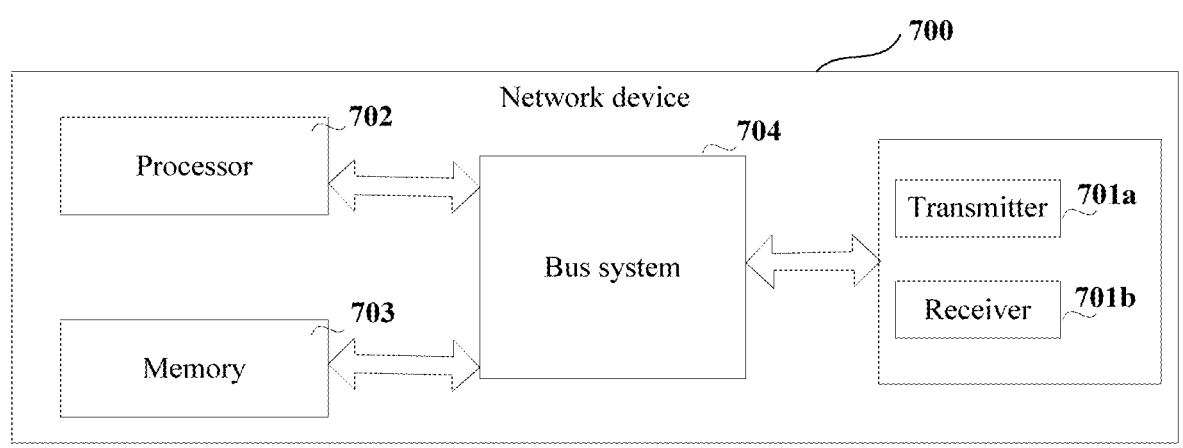
FIG. 7 is a schematic structural diagram of another network device according to this application.

FIG. 7 is a schematic structural diagram of another network device according to this application. The network device is configured to perform a procedure corresponding to the foregoing system information sending method. As shown in FIG. 7, the network device 700 includes: a transmitter 701*a*, a receiver 701*b*, a processor 702, a memory 703, and a bus system 704.

The memory 703 is configured to store a program. Specifically, the program may include program code, where the program code includes a computer operation instruction. The memory 703 may be a random access memory (RAM), or may be a non-volatile memory, such as at least one disk memory. Only one memory is shown in the figure. Certainly, a plurality of memories may be configured as required. Alternatively, the memory 703 may be a memory in the processor 702.

The memory 703 stores the following elements, executable modules or data structures, or a subset thereof, or an extended set thereof: operation instructions, including various operation instructions, and used to implement various operations; and an operating system, including various system programs and used to implement various basic services and process a hardware-based task.

The processor 702 controls an operation of the network device 700, and the processor 702 may also be referred to as a CPU (central processing unit). During specific application, components of the network device 700 are coupled together by using the bus system 704. In addition to a data bus, the bus system 704 includes a power bus, a control bus, a status signal bus, and the like. However, for clear description, various types of buses in the figure are marked as the bus system 704. For ease of representation, FIG. 7 shows only an example.

The method disclosed in the foregoing embodiments of this application may be applied to the processor 702, or may be implemented by the processor 702. The processor 702 may be an integrated circuit chip and has a signal processing capability. In an implementation process, steps in the foregoing methods can be implemented by using a hardware integrated logical circuit in the processor 702, or by using instructions in a form of software. The processor 702 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 703, and the processor 702 reads information in the memory 703 and performs the following steps in combination with hardware of the processor:

The transmitter 701*a* is configured to send configuration indication information to a terminal, where the configuration indication information includes random access channel preamble RACH preamble configuration information corresponding to first system information. The receiver 701*b* is configured to receive a first request message that is used to obtain the first system information and that is sent by the terminal according to the RACH preamble configuration information corresponding to the first system information. The transmitter 701*a* is further configured to return the first system information to the terminal according to the first request message.

Optionally, the transmitter 701*a* is further configured to send type indication information to the terminal, where the type indication information is used to indicate whether the first system information is common other SI.

Optionally, the RACH preamble configuration information corresponding to the first system information is RACH preamble index information corresponding to the first system information. The transmitter 701*a* is specifically configured to: obtain, based on RACH preamble index information included in the first request message, the first system information corresponding to the RACH preamble index information included in the first request message; and send the first system information to the terminal.

Optionally, the RACH preamble configuration information corresponding to the first system information is RACH preamble index information corresponding to a system information group in which the first system information is located. The transmitter 701*a* is specifically configured to: obtain, based on RACH preamble index information included in the first request message, a system information group corresponding to the RACH preamble index information included in the first request message, where the system information group includes the first system information.

Optionally, the RACH preamble configuration information corresponding to the first system information is RACH preamble-occupied resource information corresponding to the first system information. The receiver 701*b* is specifically configured to: receive, according to the RACH preamble-occupied resource information corresponding to the first system information, the first request message that is sent by the terminal by using the RACH preamble-occupied resource information corresponding to the first system information.

Optionally, the RACH preamble-occupied resource information corresponding to the first system information includes time domain resource information reserved in the RACH preamble-occupied resource information, and frequency domain resource information corresponding to the reserved time domain resource information.

It can be learned from the foregoing content that, in this application, the terminal receives the configuration indication information sent by the network device, where the configuration indication information includes the RACH preamble configuration information corresponding to the first system information; and the terminal sends the first request message used to obtain the first system information, to the network device according to the RACH preamble configuration information corresponding to the first system information, so that the RACH preamble configuration information is reused in the first request message, thereby greatly reducing system resources occupied by the first request message.

Persons skilled in the art should understand that the embodiments of the present invention may be provided as a method, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

Obviously, persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   receiving, by a terminal, from a network device, configuration indication information;
   sending, by the terminal to the network device, a first request message requesting first system information according to random access channel (RACH) preamble configuration information corresponding to the first system information according to a determination, by the terminal, that the configuration indication information comprises the RACH preamble configuration information corresponding to the first system information;
   receiving, by the terminal, the first system information returned by the network device according to the first request message according to the determination, by the terminal, that the configuration indication information comprises the RACH preamble configuration information corresponding to the first system information;
   sending, by the terminal to the network device, a radio resource control (RRC) signaling requesting the first system information according to a determination, by the terminal, that the configuration indication information does not comprise the RACH preamble configuration information corresponding to the first system information; and
   receiving, by the terminal, from the network device, the first system information returned by the network device according to the RRC signaling according to the determination, by the terminal, that the configuration indication information does not comprise the RACH preamble configuration information corresponding to the first system information.

2. The method according to claim 1, wherein the RACH preamble configuration information corresponding to the first system information is RACH preamble index information corresponding to the first system information; and
   sending, by the terminal to the network device, the first request message requesting the first system information according to the RACH preamble configuration information corresponding to the first system information comprises:
   sending, by the terminal to the network device, the first request message according to the RACH preamble index information corresponding to the first system information, and the first request message comprises the RACH preamble index information corresponding to the first system information.

3. The method according to claim 1, wherein the RACH preamble configuration information corresponding to the first system information is RACH preamble-occupied resource information corresponding to the first system information; and
   sending, by the terminal to the network device, the first request message requesting the first system information according to the RACH preamble configuration information corresponding to the first system information comprises:

sending, by the terminal to the network device, the first request message according to the RACH preamble-occupied resource information corresponding to the first system information.

4. A method, comprising:
determining, by a network device, whether configuration indication information comprises random access channel (RACH) preamble configuration information corresponding to first system information;
sending, by the network device, the configuration indication information to a terminal;
receiving, by the network device, from the terminal, a first request message requesting the first system information based on the configuration indication information comprising the RACH preamble configuration information corresponding to the first system information, wherein the first request message is sent according to the RACH preamble configuration information corresponding to the first system information;
returning, by the network device, the first system information to the terminal according to the first request message;
receiving, by the network device, a radio resource control (RRC) signaling requesting the first system information based on the configuration indication information not comprising the RACH preamble configuration information corresponding to the first system information; and
returning, by the network device, the first system information to the terminal according to the RRC signaling.

5. The method according to claim 4, wherein the RACH preamble configuration information corresponding to the first system information is RACH preamble index information corresponding to the first system information; and
returning, by the network device, the first system information to the terminal according to the first request message comprises:
obtaining, by the network device according to the RACH preamble index information comprised in the first request message, the first system information corresponding to the RACH preamble index information comprised in the first request message; and
sending, by the network device, the first system information to the terminal.

6. The method according to claim 4, wherein the RACH preamble configuration information corresponding to the first system information is RACH preamble-occupied resource information corresponding to the first system information; and
receiving, by the network device, the first request message requesting the first system information comprises:
receiving, by the network device, from the terminal, the first request message, wherein the first request message is sent according to the RACH preamble-occupied resource information corresponding to the first system information.

7. An apparatus, comprising at least one processor and at least one memory storing instructions, wherein the instructions are executed by the at least one processor to cause the apparatus to:
receive configuration indication information sent by a network device; and
send, to the network device, a first request message requesting first system information according to random access channel preamble (RACH) preamble configuration information corresponding to the first system information according to a determination by the apparatus that the configuration indication information comprises the RACH preamble configuration information corresponding to the first system information;
receive the first system information returned by the network device according to the first request message when the apparatus determines that the configuration indication information comprises the RACH preamble configuration information corresponding to the first system information;
send, to the network device, according to a determination that the configuration indication information does not comprise the RACH preamble configuration information corresponding to the first system information, a radio resource control (RRC) signaling requesting the first system information; and
receive from the network device, the first system information returned by the network device according to the RRC signaling when the apparatus determines that the configuration indication information does not comprise the RACH preamble configuration information corresponding to the first system information.

8. The apparatus according to claim 7, wherein the RACH preamble configuration information corresponding to the first system information is RACH preamble index information corresponding to the first system information; and
wherein the instructions are executed by the at least one processor to cause the apparatus to send the first request message to the network device according to the RACH preamble index information corresponding to the first system information, wherein the first request message comprises the RACH preamble index information corresponding to the first system information.

9. The apparatus according to claim 7, wherein the RACH preamble configuration information corresponding to the first system information is RACH preamble-occupied resource information corresponding to the first system information; and
wherein the instructions are executed by the at least one processor to cause the apparatus to send the first request message to the network device according to the RACH preamble-occupied resource information corresponding to the first system information.

10. A device, comprising: at least one processor and at least one memory storing instructions, wherein the instructions are executed by the at least one processor to cause the device to:
determine whether configuration indication information comprises random access channel (RACH) preamble configuration information corresponding to first system information;
send the configuration indication information to a terminal;
receive, from the terminal, a first request message requesting first system information if the configuration indication information comprises the RACH preamble configuration information corresponding to the first system information, wherein the first request message is sent according to random access channel (RACH) preamble configuration information corresponding to the first system information; and
send the first system information to the terminal according to the first request message;
receive a radio resource control (RRC) signaling requesting the first system information if the configuration indication information does not comprise the RACH preamble configuration information corresponding to the first system information; and return the first system information to the terminal according to the RRC signaling.

11. The device according to claim 10, wherein the RACH preamble configuration information corresponding to the first system information is RACH preamble index information corresponding to the first system information, wherein the instructions further include instructions to:
obtain, according to the RACH preamble index information comprised in the first request message, the first system information corresponding to the RACH preamble index information comprised in the first request message; and send the first system information to the terminal.

12. The device according to claim 10, wherein the RACH preamble configuration information corresponding to the first system information is RACH preamble-occupied resource information corresponding to the first system information;

wherein the instructions further include instructions to receive the first request message from the terminal, wherein the first request message is sent according to the RACH preamble-occupied resource information corresponding to the first system information.

* * * * *